(12) United States Patent
Peters

(10) Patent No.: US 11,001,189 B1
(45) Date of Patent: May 11, 2021

(54) INTERLOCKING, QUICK-RELEASE HORIZONTAL LOGISTIC TRACK

(71) Applicant: Daniel Peters, Lafayette, IN (US)

(72) Inventor: Daniel Peters, Lafayette, IN (US)

(73) Assignee: Sheridan, LLC, Lafayette, IN (US)

( * ) Notice: Subject to any disclaimer, the term of this patent is extended or adjusted under 35 U.S.C. 154(b) by 59 days.

(21) Appl. No.: 16/355,422

(22) Filed: Mar. 15, 2019

Related U.S. Application Data

(60) Provisional application No. 62/643,374, filed on Mar. 15, 2018.

(51) Int. Cl.
*B60P 7/08* (2006.01)
(52) U.S. Cl.
CPC .................................. *B60P 7/0815* (2013.01)
(58) Field of Classification Search
CPC .. B60P 7/0815; B60P 7/08; B60P 7/15; B60P 7/0807
USPC ....... 410/102, 104, 105, 106, 108, 110, 113, 410/114, 115, 116, 130, 150
See application file for complete search history.

(56) References Cited

U.S. PATENT DOCUMENTS

| | | | |
|---|---|---|---|
| 4,168,667 | A | 9/1979 | Loomis |
| 5,516,246 | A | 5/1996 | Helton |
| 5,807,047 | A | 9/1998 | Cox |
| 6,364,141 | B1 | 4/2002 | Ehrgott |
| 6,895,867 | B1 | 5/2005 | Burrows |

(Continued)

OTHER PUBLICATIONS

Kinedyne® Series E or A Track Fittings, [online], undated, [retrieved Jun. 21, 2019]. Retrieved from the Internet: http://www.kinedyne.com/products/171/series-e-or-a-track-fittings.html#product-list, 3 pages.

*Primary Examiner* — Stephen T Gordon
(74) *Attorney, Agent, or Firm* — William F. Bahret

(57) ABSTRACT

A quick-release, horizontal logistic track having a coupling mechanism that allows two such quick-release logistic tracks to interlock so as to effectively form a continuous track that varies in length as a section of track is added or removed from the series. Installed, the multiple sections of quick-release logistic track become one integrated track that is flush from end to end on the same sidewall. The quick-release logistic track has two integral couplings that consist of a male coupling and a female coupling on opposing ends enabling the male end of a newly installed track in the series to be coupled to a female end of a separate track that is already anchored in a vertical logistic post slot. As the newly installed track's male end is coupled to the anchored female end the newly installed track's opposing female end is then anchored to an adjacent vertical logistic post slot. This method is repeated until the desired length of quick-release logistic track is satisfied. The male and female couplings on opposing ends of a track allow for only one end of a quick-release logistic track to be anchored in a vertical logistic post slot when attaching multiple tracks in a series to a sidewall. While the female coupling of one track is anchored in a vertical logistic post slot the male coupling of another track is able to leverage the female coupling's push, pull, and vertical forces by inserting itself. The male and female couplings allows for multiple tracks to be installed quickly and efficiently in a continuous series of tracks down one sidewall.

8 Claims, 3 Drawing Sheets

(56) References Cited

U.S. PATENT DOCUMENTS

| | | | |
|---|---|---|---|
| 7,578,644 B2 * | 8/2009 | Squyres | B60P 1/00 410/143 |
| 7,758,644 B2 | 7/2010 | Trieu | |
| 8,028,845 B2 | 10/2011 | Himes | |
| 8,057,142 B1 | 11/2011 | Alamillo | |
| 8,439,612 B2 | 5/2013 | Chamoun | |
| 9,834,130 B1 | 12/2017 | Peters | |
| 2008/0083860 A1 * | 4/2008 | Neumann | B60R 7/02 248/224.8 |
| 2009/0016840 A1 * | 1/2009 | Squyres | B61D 45/006 410/130 |
| 2009/0317205 A1 * | 12/2009 | Heng | B60P 7/15 410/52 |
| 2012/0091087 A1 | 4/2012 | Hines | |
| 2013/0136556 A1 | 5/2013 | Bose | |

* cited by examiner

INTERLOCKING, QUICK-RELEASE HORIZONTAL LOGISTIC TRACK

CROSS-REFERENCE TO RELATED APPLICATION

This application claims the benefit of Provisional Patent Application No. 62/643,374, filed Mar. 15, 2018, which application is hereby incorporated by reference along with all references cited therein.

FIELD

This invention is in the field of cargo tie down logistic tracks or cargo tie down vertical logistic posts used in the cargo areas of semi-trailers and other cargo transporting vehicle bodies.

BACKGROUND

Industry Definitions

Logistic: Simply means there is some form of tie down location inside the cargo area of a semi-trailer and other cargo transporting vehicles; usually in the form of vertical posts with slots or horizontal track with slots that cargo securing devices can lock into. Logistic refers to movement and, in this case, with logistic posts or logistic track one can move cargo securing devices to different areas within the cargo area.

Flush Mount: An object that lies flat against a surface.

Horizontal Logistic Track: Typically a steel track that has holes punched side by side in a perfect row on two inch increments so that cargo securing devices can lock into the holes in order to secure cargo from moving during transit. The holes vary in shape but are mostly a rectangle shape (referred to as a slot) measuring two and three eighths of one inch tall and one half of an inch wide. When the track is mounted the holes (slots) only have a depth of three eighths of one inch. The track is permanently mounted at various heights with bucking rivets, huckbolts—monobolts or bolts and nuts and is commonly installed the entire length on each of the vehicle's sidewalls. This track cannot be repositioned once it is installed. It is installed in equal quantities at the factory and in the aftermarket; consisting of similar market share. This is not an integral part of the vehicle's body.

Vertical Logistic Post: Typically a permanently mounted steel or aluminum upright post (vertical position—floor to ceiling) that has holes punched above one another in a perfect row in two inch to three inch increments so that cargo securing devices can lock into the holes in order to secure cargo from moving during transit. The holes vary in shape but are mostly a rectangle shape (referred to as a slot) measuring two and three eighths of one inch tall and one half of an inch wide. On posts, the holes (slots) have a depth that ranges from three eighths of one inch to one and one quarter of one inch. Virtually every semi-trailer has vertical posts and the posts are commonly positioned on forty eight inch or fifty inch centers throughout the sidewalls. The post is an integral part of the sidewall construction and is only installed at the factory. More posts cannot be added in the aftermarket due to cost. If a post does not have holes (slots), it is referred to as a plain post. Holes cannot be added to plain posts due to cost.

Cargo Tie down/Cargo securing device: A device that secures cargo from moving while being transported. On semi-trailers or other enclosed cargo hauling vehicles, bars and straps are commonly used to accomplish this and they usually connect from one sidewall to the other and the device has ends that lock into a slot on a permanently mounted vertical logistic post or horizontal logistic track that is located on each sidewall—ensuring the device remains in place should the cargo shift during transport. The device is placed as close to the cargo as possible.

Cargo tie down horizontal and/or vertical logistic tracks and/or vertical logistic posts are commonly installed, permanently, on the interior sidewalls of semi-trailers or other cargo transporting vehicle bodies in order to secure the ends of various cargo tie down devices used to secure cargo from moving. Logistic track is most commonly installed horizontally; however, the can be placed vertically as well. Throughout this writing the standard horizontal position is referenced. These cannot be repositioned by the operator to obtain closer spacing between logistic slots in order to better secure the cargo should the cargo be positioned in an area that is not near a logistic slot. In certain cases, both horizontal logistic tracks and vertical logistic posts are installed on the interior sidewall to maximize available logistic slot access at any location. The horizontal logistic tracks or vertical logistic posts are located directly across from one another on the opposing sidewall so that cargo restraint devices can be locked into each side in order to secure cargo from moving while it is being transported from its origin to its destination.

Cargo tie down horizontal logistic tracks are commonly known by those in the industry as horizontal E series track (E-track) or horizontal A series track (A-track), but are not limited to these in shape or name; however, these two horizontal logistic tracks are considered the industry standard horizontally mounted logistic tracks used in securing cargo restraint devices such as cargo bars or strap based devices. These tracks perform well in securing cargo at any location from the nose to the rear of the cargo area but do not perform well with cargo that has different heights or needs secured at one location but at various heights. The horizontal logistic tracks are traditionally installed on sidewalls that only have vertical non logistic posts, posts without a logistic slot or called plain posts; however, there continues to be a demand to also install horizontal logistic tracks on sidewalls with vertical logistic posts due to the greater spacing between the posts. The horizontal logistic tracks are permanently mounted with fasteners such as aluminum buck rivets, bolts and nuts or screws, usually on six to eight inch centers depending upon the type of sidewall construction that the horizontal logistic track is being fastened to. The horizontal logistic track is not considered an integral part of the sidewall construction. The horizontal logistic tracks are most commonly mounted horizontally, as denoted in the name, and on each sidewall, full length on the sidewall, from most rear to most front, and are located directly across from one another on each sidewall, running parallel to the floor. The horizontal logistic tracks are mounted at varying heights and measured from floor to centerline of the track when mounting at a specific dimension. There is no standard dimension for a specific height and varies per owner and type of freight being transported. The horizontal logistic tracks are produced in varying lengths such as a one piece full length that measures as long as fifty two feet six inches or in ten feet lengths that are butted together to make a full length piece. Each installer determines which lengths work best for them when installing at the factory or in the aftermarket. Horizontal logistic tracks are most commonly overlaid flush mount on the sidewall but can be recessed depending upon the type of sidewall construction. Both, E series and A series horizontal logistic tracks have slots, that measure one half inch wide by two and three eighths of one inch in height and are punched on two inch centers the full length of each horizontal logistic track to which most all cargo bars and strap restraint devices' locking ends are designed to attach to. The E series horizontal logistic track's slot has rolled sides where as the A series logistic track does not—though each has a universal acceptance of most industry accepted cargo securing device ends. The horizontal logistic tracks can either be installed at the time the semi-trailer or cargo transporting vehicle body is being manufactured or in the aftermarket. Material most commonly used to form the horizontal logistic track is carbon steel but can be made with almost any material known to those in the trade.

When installing horizontal logistic track to secure loads it is difficult to identify the exact height of the cargo that is being transported since semi-trailers and other cargo transporting vehicle bodies go through various transporting applications as the equipment ages and as an owner looks for a one size fits all approach to transporting cargo and, of course, the vehicle usually gets sold, traded or leased to a new owner at some point in its life cycle and, in this case, the new owner will more than likely have different needs for cargo that they transport. In many cases, multiple pairs of horizontal logistic track have to be permanently installed at various heights to try and accommodate the many variables of cargo heights that may be incurred. This ultimately results in a burden to the owner in both increased costs for installation and increased weights and still does not guarantee that the correct height will be obtained to properly secure certain cargo. Another important burden for permanent installation of horizontal logistic track on the leading sidewall types, Duraplate and composite material are the hundreds of additional holes have to be drilled through the sidewall for permanent mounting which poses potential problems for leaking sidewalls when rain or snow occurs as well as trade value is reduced if permanently mounted logistic track is included.

Vertical logistic posts are permanently mounted, floor to ceiling, and are considered an integral part of the sidewall construction that attaches two forty eight inch to forty nine inch wide industry standard panels together and are installed at the time the semi-trailer or cargo transporting vehicle body is manufactured. These vertical logistic posts are commonly installed on forty eight inch or fifty inch centers to match the width of the panels it is attaching together and are commonly attached to the panels with aluminum buck rivets. These posts perform well in securing freight at any height from the floor to the ceiling of the cargo area but do not perform well with cargo that falls short or aft of the post. The vertical logistic post's slots are punched into the post in a vertical pattern, above one another, the entire height of the post, floor to ceiling, compared to the horizontal logistic tracks that have their respective slots punched side by side. The slots measure the same size as E series and A series horizontal logistic track, one half inch wide by two and three eights of one inch in height. Vertical logistic posts are not added to a semi-trailer or cargo transporting vehicle body after the unit is manufactured in an attempt to close the distance of the spacing of its logistic slot. This is due to extensive labor costs associated with the posts installation—only in repair situations would a vertical logistic post be added to replace a damaged post. Material most commonly used to form the logistic post is carbon steel but has also been known to be made of aluminum or other types of metal and composite material. Vertical logistic posts are most commonly formed as a one piece post; however, in certain sidewalls a steel flat plate with punched slots is used as the face of the post—such designs are for the Duraplate or comparable sidewall construction which are commonly on fifty inch centers. Other less common vertical logistic post spacing that is used in the construction of sidewalls is sixteen inch and twenty four inch but these add cost and weight and are not considered a current standard or specification. Note that certain one piece sidewall constructions may use a vertical logistic post that is not considered an integral part of the sidewall—such examples included the Fiberglass Reinforced Panel (FRP), a sidewall construction that has almost become obsolete when making semi-trailers due to its weight and material cost.

Vertical logistic posts commonly installed on forty eight inch or fifty inch centers allows for cargo to be secured tightly only if the cargo stops just short of a post on a forty eight inch center, greatly limiting the ability to secure cargo properly when the cargo is not placed perfectly in line with a slot. Strap style cargo restraint devices may add more flexibility in securing cargo at unfavorable locations in the cargo area; however, if the freight is located less than two inches or so from the sidewall a strap cannot be easily secured in a slot that is forward of the freight due to a certain distance between the sidewall and freight being required in order for the hands and arms of an operator to reach between the freight and sidewall to secure the strap's end fitting into a slot and the distance to the next accessible slot may be too far to reach. In this case, the invention allows for a strap style cargo restraint to be installed on the invention prior to it being positioned between the freight and sidewall requiring only one inch or less clearance between the freight and sidewall. Also freight cargo beams are deemed a very common form of freight securing devises and in these cases the cargo would be able to travel as great as approximately forty eight inches before it is stopped by the next cargo beam location if the cargo is placed just aft of a logistics post. Any movement at all in the cargo has many dangers—the product can shift causing body damage to the vehicle, the product can shift causing damage to the cargo itself and in worse case scenarios shifting of cargo can cause a catastrophic failure to the vehicle and or a roll-over incident can occur. Most manufacturers offer closer vertical logistic posts centers as an upgrade to include twelve inch, sixteen inch and twenty four inch vertical logistic post centers but these still do not guarantee that cargo will be placed at the exact location needed to properly secure cargo tightly. In addition, these closer twelve inch, sixteen inch and twenty four inch centered posts add a burden to the owner in both increased installation costs and increased weights. The increased weight is, again, a two fold disadvantage to any owner; limiting the amount of product transported and carrying a penalty in increased fuel usage.

BRIEF SUMMARY OF THE INVENTION

The present invention provides a quick-release, horizontal logistic track having a coupling mechanism that enables two or more such quick-release logistic tracks to connect in-line as if parts of one integral track.

BRIEF DESCRIPTION OF THE DRAWINGS

FIGS. 1-4 are scale drawings, FIGS. 2-4 being drawn to the same scale as each other.

FIG. 6A shows a first E-track with its female coupler anchored to a vertical logistic post, and a second E-track positioned for coupling to the first E-track. FIG. 6B depicts the insertion of the male coupler of the second E-track into the anchored female coupler.

FIG. 6C shows the newly installed track in its fully coupled position with respect to the previously installed track.

DETAILED DESCRIPTION OF PREFERRED EMBODIMENTS

Figure 1:
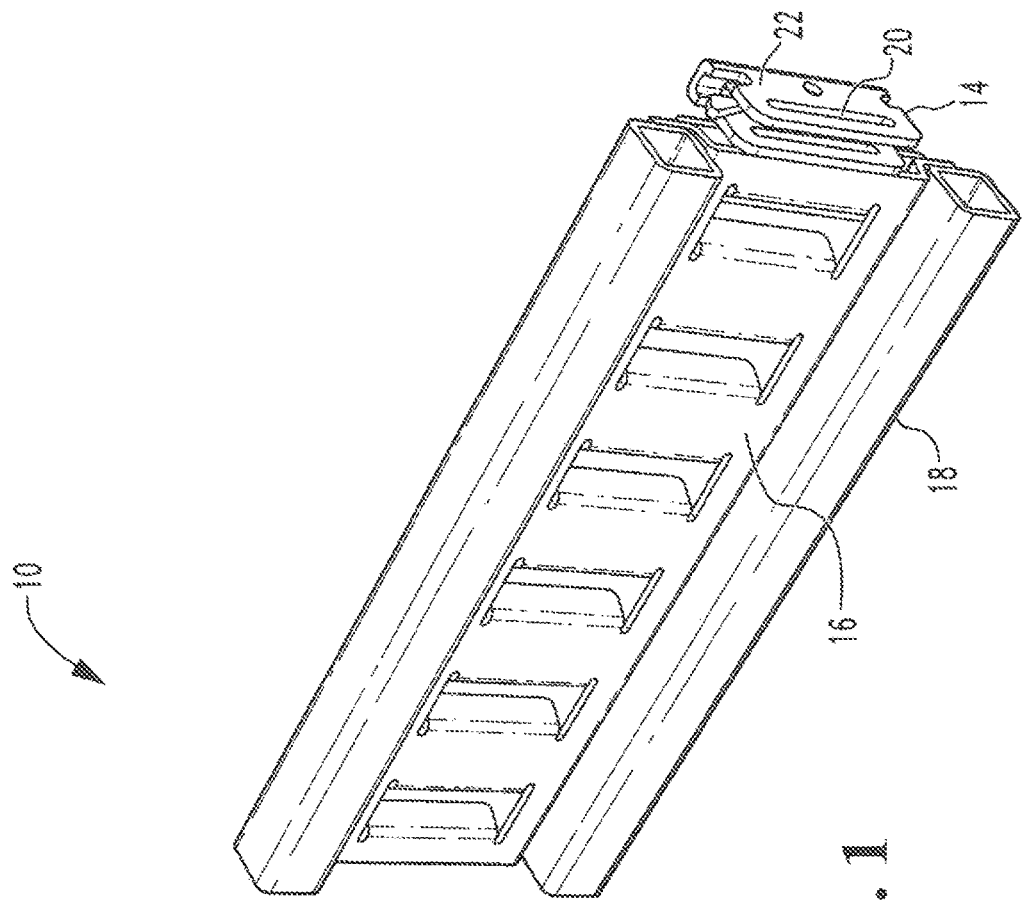
FIG. 1 is a perspective view of a preferred embodiment of an interlocking, quick-release, horizontal logistic track having opposed male and female couplers according to the present invention.
Figure 1:
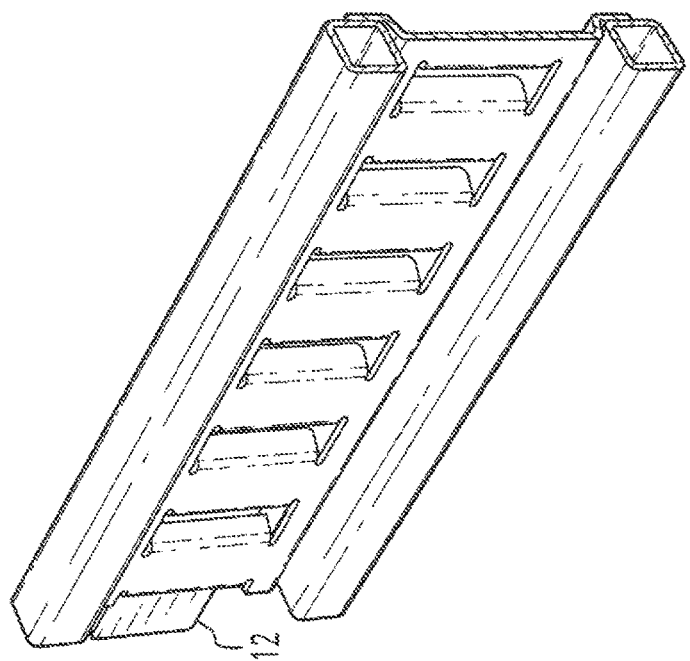
Figure 3:
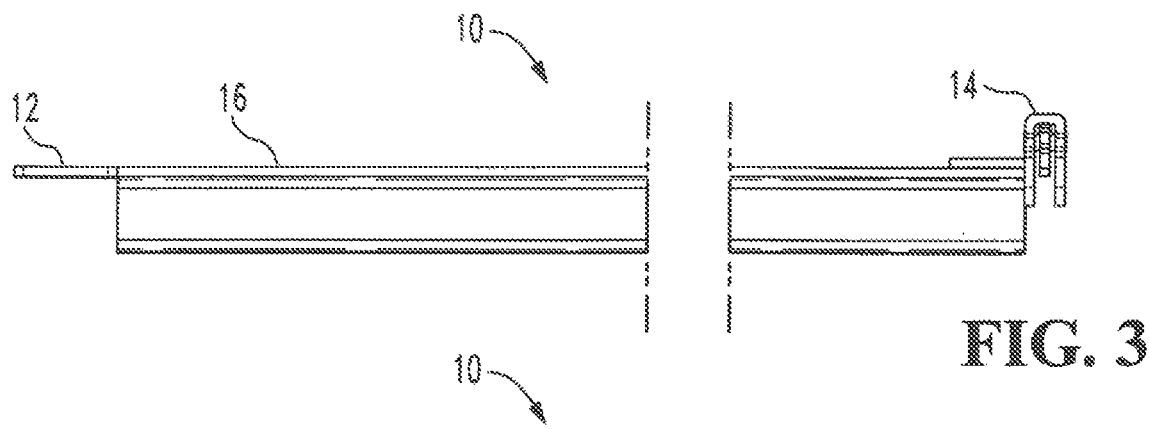
FIG. 3 is a top view of the interlocking, quick-release logistic track of FIG. 1.
Figure 2:
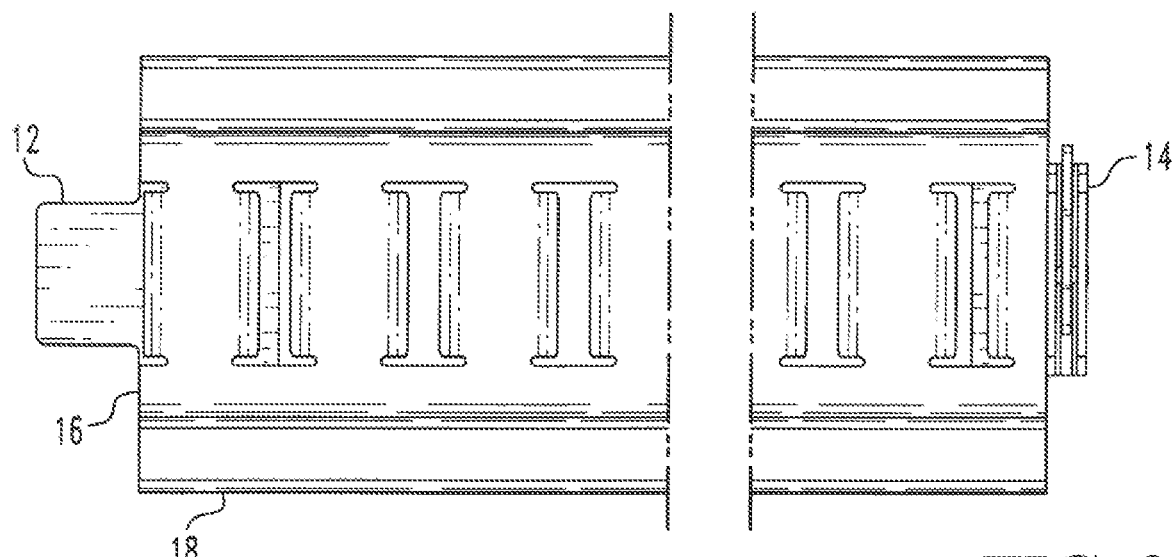
FIG. 2 is a front view of the interlocking, quick-release logistic track of FIG. 1.
Figure 4:
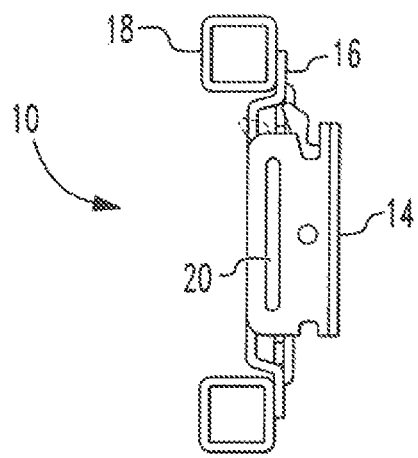
FIG. 4 is a right end view of the interlocking, quick-release logistic track of FIG. 1.

For the purpose of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device and such further applications of the principles of the invention as illustrated therein being contemplated as would normally occur to one skilled in the art to which the invention relates.

FIGS. 1-4 depict a preferred embodiment of an interlocking, quick-release, horizontal logistic track 10 having opposed male and female couplers according to the present invention. This embodiment has a male coupler or tongue 12 and a female coupler 14 on opposite ends of an E-track 16 that is reinforced along its top and bottom edges with 1"×1" square steel tubing 18. The male coupling consists of a fabricated or stamped plate sized and shaped so that the base can fasten directly to the logistic track and the male end portion or tongue extends beyond the logistic track allowing it to couple inside a female coupling. It may have the following dimensions: ⅛ inch thickness by 3½ inch height by 3¼ inch length overall, with the tongue extending beyond the end of track 16 by 1½ inches and having a height of 1⅞ inches. Extending the tongue by an additional 2 inches advantageously allows the track to fit all logistic side post spacings including standard spacings that are submultiples of 48 inches (e.g., 12, 16, 24 and 48 inches) as well as spacings that exceed 48 inches. The male coupling's tongue allows enough play when inserted into a female coupling to give the track the necessary tolerances to fit into any post center that may be slightly off in its measurements due to manufacturing tolerances or due to a post being bent from forklift abuse. The material may be carbon steel, or the coupling may be made from other materials such as galvanized or stainless steel, aluminum or composite. Other attachments of like design known to those in the trade can be attached to the logistic track.

The female coupling has a fabricated or stamped shape that can anchor to a vertical logistic post slot with a hole or other opening that is exterior of the post allowing a male coupling to attach and extend through enabling the male coupling to take advantage of the female coupling's push, pull and vertical forces as a result of its ability to anchor in a vertical logistic post slot. One presently preferred coupling is an E-track spring fitting or clip having a pair of vertical slots 20 in two parallel slotted plates 22 joined on one end as to have a U-shaped cross-section, as shown, e.g., in FIGS. 1-3. One or both of the slotted plates are welded or otherwise fixedly attached to the E-track on one end thereof, with the slotted plates perpendicular to the E-track's backside plane and with the fitting extending rearwardly from the backside plane so as to facilitate insertion of the fitting's closed end into a slot in a vertical logistic post. Example spring fittings include Kinedyne Part Nos. FE8306-1 and FE8029-1, and Ancra Part No. 47608-21. The spring fitting may have a ⅛-inch material thickness, 3-inch overall height (including finger-actuated latch arm), ½-inch width (measured on the longitudinal axis of track 10), 1¼ inch depth (the dimension perpendicular to the track's backside plane), and 2-inch slot height (slots 20). The coupling can be made from carbon steel, or other materials such as galvanized or stainless steel, aluminum or composite. Other attachments of like design known to those in the trade can be attached to the logistic track.

As one alternative, a spring coupler as shown and described in U.S. Pat. No. 9,834,130 may be employed and/or modified to receive a male coupling of the type described herein. For example, a connection slot may be provided in the curved end piece of the E-track, or, in place of the curved end piece, a slotted plate perpendicular to the E-track may be added to receive the male part of the adjacent logistic track, with the slot and adjacent male coupling located such that, when mutually engaged, the adjacent logistic track lies flush against the trailer side wall.

As a second alternative, two male couplings such as the one male coupling described herein may be attached to opposite ends of E-track and secured independently of or in-line to other tracks by female couplings secured to or independent of E-track allowing E-track to lock into logistic post slot. Any combination of male and female couplings attached to or independent of E-track allows for the securing of E-track to a logistic post slot or other in-line tracks.

Figure 6A:
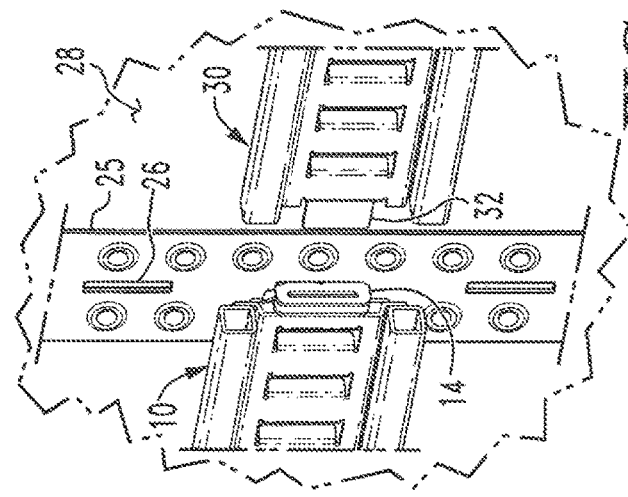
FIGS. 6A, 6B and 6C depict the sequence of interconnecting horizontal logistic tracks of the type shown in FIGS. 1-4.
Figure 6B:
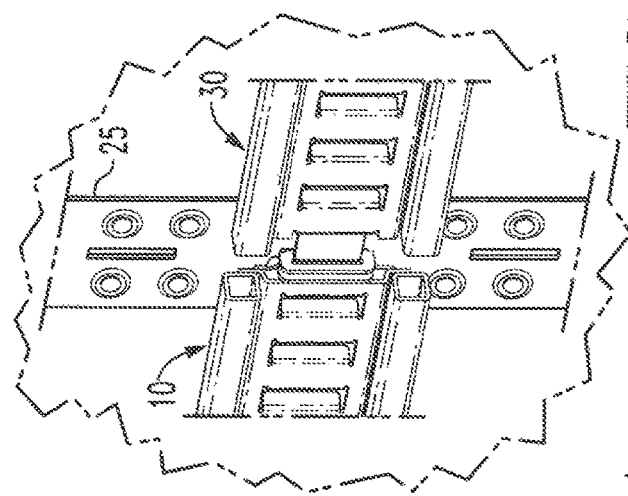
Figure 6C:
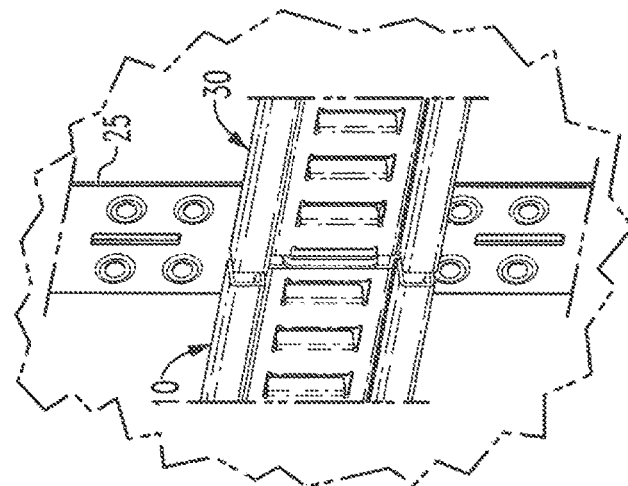

FIGS. 6A-6C depict the sequence of interconnecting horizontal logistic tracks of the type shown in FIGS. 1-4. FIG. 6A shows E-track 10 installed on a trailer wall 28 and an identical E-track 30 positioned for coupling to E-track 10. E-track 10 is anchored via coupler 14 to a vertical logistic post 25 having spaced vertical slots 26 as shown. Coupler 14 is an E-track spring fitting with upper and lower notches (each approximately ¼ inch wide) and with a spring-loaded latch arm having a shoulder extending above the bottom of the upper notch as perhaps best shown in FIG. 4, whereby the shoulder in its normal position effectively decreases the depth of the notch. Retraction of the latch arm as shown in dashed lines in FIG. 4 opens up the notch. Coupler 14 is attached to the logistic post by retracting the latch arm, inserting the upper end of the fitting into a desired slot 26 and lifting it so as to bring the bottom of the upper notch into contact with the upper edge of the slot, inserting the lower end of the fitting into the slot and lowering it to have the lower notch rest on the lower edge of the slot, and then releasing the latch arm. When E-track 10 is the first track installed in a series of tracks or is installed independently, its left end (unshown) may also have such an E-track fitting slidably mounted, via its vertical slots, on the male coupler allowing it to slide in a left and right motion, or an E-track fitting can be installed independently, as a starting coupler, into a logistic post's slot allowing the male coupler of E-track 10 to be inserted into the fitting slots. Alternatively, the E-track may have a permanently attached E-track fitting instead of male coupler 12, or it may have a spring coupler as shown and described in U.S. Pat. No. 9,834,130, which is hereby incorporated by reference in its entirety.

Figure 7:
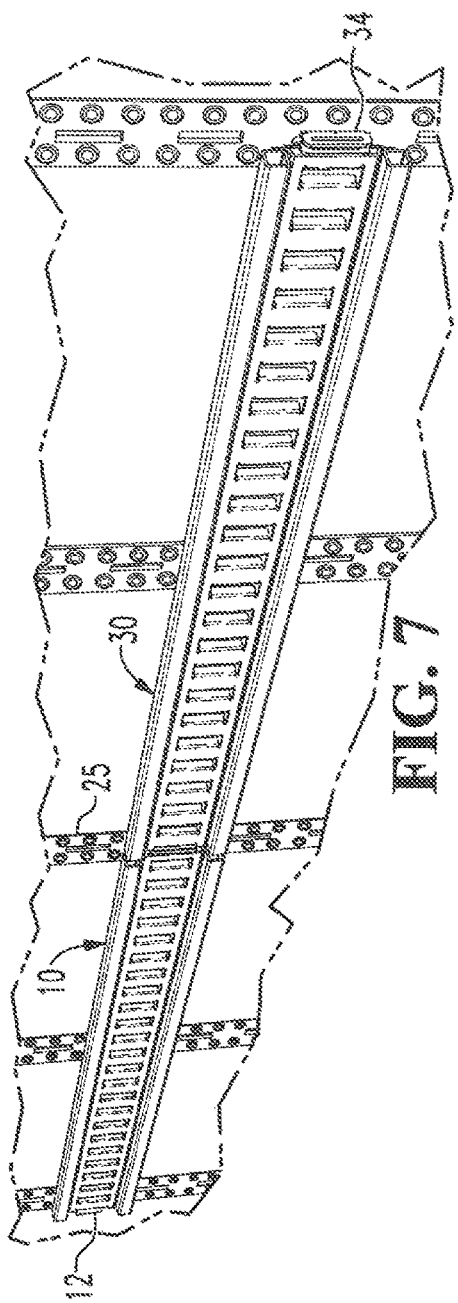
FIG. 7 shows the full lengths of two fully coupled logistic tracks interlocked in-line so as to effectively act as one continuous track on a trailer sidewall.

The installation sequence for E-track 30 continues with the insertion of the male coupler of track 30 into the vertical slots in anchored coupler 14, as depicted in FIGS. 6B and 6C. The right end of track 30, shown in FIG. 7, is anchored to another vertical logistic post by a coupler 34 that is identical to coupler 14. Track 30 is slightly rotated about its longitudinal axis, initially by tilting it toward the trailer wall, to facilitate the above-described sequential insertion of the upper and lower ends of the coupler into the logistic post slot. The mating couplers are configured to allow sufficient rotation for this purpose, e.g., by providing a tongue thickness sufficiently less than the slot width of the slotted plates of the female coupler to allow a small degree of rotation, e.g., approximately 10°, or less in certain applications, e.g., approximately 2-5°. As one example, it is suitable with 4-foot long E-track for the male coupler to have a thickness of ⅛ inch as described above, and for the vertical slots in the female coupler to have a width of 5/32 inch or so. It is noted in this regard that the notches in E-track fitting 14 itself allow a small degree of rotation of installed track 10 as track 30—after coupling with track 10—is rotated as described above.

Figure 5:
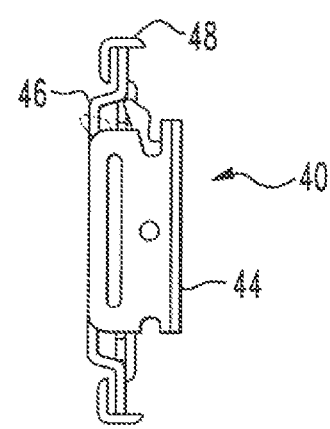
FIG. 5 is a right end view of a second embodiment of an interlocking, quick-release logistic track according to the present invention.

FIG. 5 depicts one alternative embodiment 40 of an interlocking, quick-release, horizontal logistic track according to the present invention. This embodiment is the same as the first except for the extent of reinforcement of the E-track. It has a female coupler 44 on one end of an E-track 46, with moderate reinforcement provided in the form of angle iron 48 along the top and bottom edges of the E-track. The angle iron may be welded or otherwise joined to the E-track, or may be integrally formed therewith, as may reinforcement 18 of the first embodiment. The E-track may alternatively be stiffened or reinforced with round or triangular tubing, or flat bar stock placed longitudinally, or a backside frame either in box form or in the form of upper and lower longitudinal bars or other frame members.

It will be appreciated from the foregoing that the disclosed embodiments of the present invention provide in-line interlocking of logistic tracks that effectively function as one continuous track on a trailer sidewall. Various embodiments of couplings in accordance with the present invention have been described herein, and they are regarded as examples embodying a number of novel aspects of the invention.

Encompassing the invention's in-line interlocking technology that allows for multiple tracks to be installed in a systematic way is also the ability for non-asset based users to incorporate this new track system into their daily operations in order to increase the amount of freight loaded inside semi-trailers on a second level even though the user does not own or have trailers dedicated to them by a third party carrier. In addition to and coupled with this is the track system's recycling process allowing the non-asset based user to install at the origin and remove at a separate destination, simultaneous to loading and unloading their freight, at which time the user recycles the track system back into their operations by an alternate means of transportation, creating a track system that can be used cost effectively and on a repeating basis. For example, with this system, a manufacturer may have its products shipped by a third party trucking company in semi-trailers without E-track or without sufficient E-track, the manufacturer providing quick-release E-track according to the present invention for use in the trailers while in transit and arranging for removal and return of the quick-release E-track at the destination.

While the invention has been illustrated and described in detail in the drawings and foregoing description, the same is to be considered as illustrative and not restrictive in character, it being understood that only preferred embodiments have been shown and described and that all changes and modifications that come within the spirit of the invention are desired to be protected.

What is claimed:

1. An interlocking, quick-release, horizontal logistic track, comprising:
    a slotted horizontal track having opposed first and second ends;
    a track-to-track coupling on said first end of said track; and
    a track-to-wall coupling and a track-to-track coupling on said second end of said track, said track-to-wall coupling designed for coupling said track to a sidewall of a trailer, said track-to-track coupling on said second end designed for coupling said track to one end of a second quick-release, horizontal logistic track of like design.

2. The interlocking, quick-release, horizontal logistic track of claim 1, wherein said first end of said track has no track-to-wall coupling.

3. The interlocking, quick-release, horizontal logistic track of claim 1, wherein said track-to-track couplings are in-line couplings.

4. The interlocking, quick-release, horizontal logistic track of claim 1,
    wherein said track-to-track coupling on said first end of said track is a male coupling;
    wherein said track-to-wall coupling on said second end of said track is designed to engage a slot in a vertical logistic post in said sidewall; and
    wherein said track-to-track coupling on said second end of said track is a female coupling designed to receive the male coupling of a second quick-release, horizontal logistic track of like design.

5. The interlocking, quick-release, horizontal logistic track of claim 4,
    wherein a coupling of said female coupling to the male coupling of the second quick-release, horizontal logistic track establishes in-line interlocking of quick-release logistic tracks as to effectively form one integral horizontal logistic track on a trailer sidewall.

6. The interlocking, quick-release, horizontal logistic track of claim 5,
    wherein said male coupling includes a vertical plate extending away from said slotted horizontal track along the longitudinal axis thereof, and wherein said female coupling includes a vertical slot aligned with said male coupling and oriented to receive the male coupling of the second quick-release, horizontal logistic track.

7. The interlocking, quick-release, horizontal logistic track of claim 6,
    wherein said track-to-wall coupling and track-to-track coupling on said second end of said track are integrally formed as an E-track spring fitting having a pair of vertical slots in two parallel slotted plates joined on one end as to have a U-shaped cross-section; and wherein said E-track spring fitting is attached to said slotted track such that said slotted plates are perpendicular to said slotted track's backside plane and said fitting extends rearwardly from said backside plane so as to facilitate insertion of said fitting's closed end into a slot in a vertical logistic post.

8. The interlocking, quick-release, horizontal logistic track of claim 7, further comprising a stiffener extending longitudinally along said slotted track creating increased rigidity over its span.

\* \* \* \* \*